United States Patent [19]

Krude

[11] Patent Number: 4,536,038
[45] Date of Patent: Aug. 20, 1985

[54] WHEEL HUB ASSEMBLY FOR A MOTOR VEHICLE

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 614,445

[22] Filed: May 25, 1984

[30] Foreign Application Priority Data

May 28, 1983 [DE] Fed. Rep. of Germany ....... 3319472

[51] Int. Cl.³ ............................................. F16C 11/06
[52] U.S. Cl. .................................. 301/124 R; 180/259; 464/178; 464/906
[58] Field of Search ................ 301/124 R, 124 H, 126; 180/258, 259, 70.1, 73.3, 73.4; 308/190, 191; 464/178, 906

[56] References Cited

U.S. PATENT DOCUMENTS

| | | | |
|---|---|---|---|
| 4,090,751 | 5/1978 | Krude | 308/191 |
| 4,094,376 | 6/1978 | Welschof | 308/191 X |
| 4,177,654 | 12/1979 | Aucktor | 464/906 X |
| 4,300,651 | 11/1981 | Krude | 180/70.1 X |
| 4,359,128 | 11/1982 | Krude | 464/906 X |
| 4,405,032 | 9/1983 | Welschof et al. | 180/259 |
| 4,424,047 | 1/1984 | Welschof et al. | 464/178 X |
| 4,427,085 | 1/1984 | Auctor | 464/178 X |
| 4,432,741 | 2/1984 | Winkler | 464/906 X |

Primary Examiner—Robert B. Reeves
Assistant Examiner—Russell D. Stormer
Attorney, Agent, or Firm—Toren, McGeady, Stanger, Goldberg & Kiel

[57] ABSTRACT

A wheel hub assembly for a motor vehicle wherein the inner race of the wheel bearing mechanism is formed on a hub member of the assembly with a spigot axially extending from one end of the hub member having mounted thereon the inner joint member of a universal joint. The inner joint member is attached to the spigot by a retaining ring and a collar is provided on the hub member having an open end facing toward the universal joint and arranged to provide a space between the outer joint member of the universal joint and the collar to permit access to the retaining ring for facilitating assembly and disassembly between the universal joint and the wheel hub assembly.

2 Claims, 1 Drawing Figure

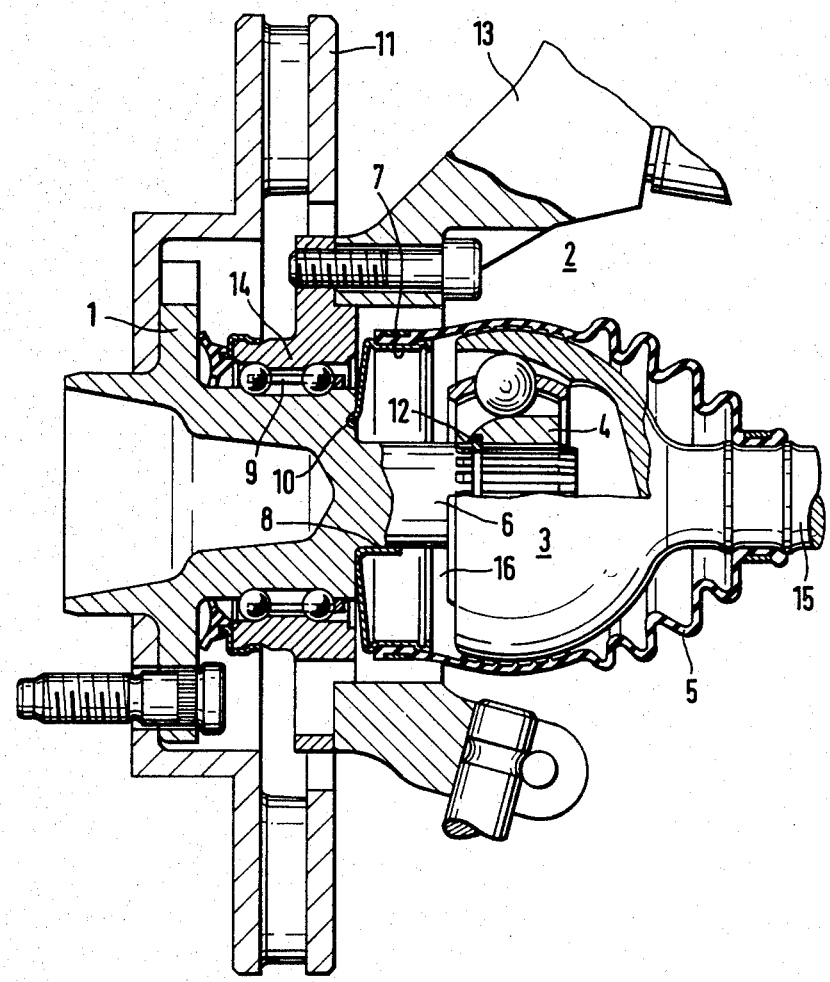

WHEEL HUB ASSEMBLY FOR A MOTOR VEHICLE

The present invention relates generally to a wheel hub assembly for a motor vehicle and more particularly to an assembly which is constructed so as to facilitate attachment and removal of a universal joint.

The assembly of the invention is one wherein there is provided a hub member, bearing means including an inner race formed on the hub member and an outer race, and a spigot on the hub member carrying the inner member of a constant velocity ratio universal joint through which the wheel may be driven.

Hub assemblies of the type to which the present invention relates are disclosed in British Pat. No. 1 553 258. In this prior art device, either a component forming the inner bearing race or the spigot is not integral with the hub member but must be connected thereto. This can cause tolerance problems in the geometry of the hub assembly. A further disadvantage of this type of prior art device is that in all the designs disclosed, the constant velocity universal joint is disposed within the inner bearing race so that the bearing assembly must be of a size which may lead to assembly problems within the limited space of a wheel assembly.

A further disadvantage which arises in prior art devices of this type is that the entire hub assembly must be designed to accommodate a predetermined size of universal joint. It is usually not possible to utilize a larger size of universal joint to suit an engine of higher performance as commonly occurs since there would be required that a completely new hub assembly be designed.

Accordingly, the present invention is directed toward provision of a hub assembly which permits easy production, wherein several sizes of universal joints can be utilized and wherein assembly and removal of the universal joint is facilitated and capable of being performed with relative ease.

The invention is also directed toward reduction in the size of bearing assemblies of the type disclosed in the prior art, for example in British Pat. No. 1 553 258.

SUMMARY OF THE INVENTION

Briefly, the present invention may be defined as a wheel hub assembly for a motor vehicle comprising a hub member, bearing means including an inner race formed on the hub member and an outer race, a spigot extending axially from an end of the hub member, a constant velocity ratio universal joint having an inner member received on the spigot and an outer member, the inner member being mounted on the spigot by a retaining ring, and a collar on the hub member having an open end facing the universal joint and adapted to receive thereon a sealing sleeve which extends to cover the universal joint. The arrangement of the invention is such that when the joint is articulated, the outer member thereof partially enters the collar but when the joint is not articulated a space is provided between the outer member and the collar to allow access to the retaining ring holding the inner joint member on the spigot.

One advantage of the hub assembly in accordance with the invention is that the constant velocity ratio universal joint is axially spaced from the inner bearing race formed on the hub member so that the size of the bearing and the joint may be independently selected to accommodate individual requirements. By holding the inner joint member on the spigot by the retaining ring, and by providing for the space to permit access to the retaining ring, it is easy to assemble or dismantle the universal joint from the hub member.

The collar which is attached to the hub member may include a cylindrical portion which may be pressed onto the spigot of the hub member before the universal joint is fitted thereto.

Alternatively, the collar may include a formation held in a groove in the hub member facing the universal joint. This arrangement permits the joint to be positioned as closely as possible to the hub member.

The universal joint may be a plunging joint, that is it may be one designed to undergo relative axial movement between the inner and outer members thereof. With such a joint, the entire assembly may be used in a rear wheel drive motor vehicle. Alternatively, the universal joint may be axially fixed which means that the hub assembly is suitable for front wheel drive vehicles.

The collar or a part rotatively affixed therewith may be designed to act as a transmitting element for a rotational speed sensor. This may be utilized, for example, in connection with an antilock braking system.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF THE DRAWING

In the drawing, FIG. 1 is a sectional view of a wheel hub assembly in accordance with the invention.

DETAILED DESCRIPTION OF THE PREFERRED EMBODIMENT

The illustrated assembly comprises a hub member 1 of generally cylindrical form, provided on its external surface with the inner race of a double row angular contact ball bearing assembly 9. The outer race of the bearing assembly is indicated at 14, and this is bolted to a wheel carrier 13. At its end pointing inwardly, having regard to its installation in a motor vehicle, the hub member 1 has an axially extending spigot 6, and at its outer end carries a ventilated brake disc 11.

The spigot 6 carries, at its free end, the inner member 4 of a constant velocity ratio universal joint indicated generally at 2. The inner joint member is connected in torque transmitting engagement to the spigot 6 by interengaging splines, and is held thereon by a spring retaining ring 12.

The universal joint further comprises an outer member 3, connected to a drive shaft 15, and there are torque transmitting balls, not numbered, between the inner and outer joint members.

An axially extending collar 7 is provided on the hub member 1, facing the universal joint 2. The collar 7 is connected to the hub member either, as shown in the upper half of the drawing by an annular formation 10 engaging in a groove in the hub member facing the universal joint, or as illustrated in the lower half of the drawing by a cylindrical projection 8 in the collar, press fitted on the spigot 6. The collar 7 carries a sealing sleeve 5, which extends over the universal joint and is connected to the drive shaft 15. The sealing sleeve 5 is flexible so as to accommodate articulation of the universal joint.

The dimensions of collar 7 are such that, when the universal joint is not articulated, a space 16 is provided between it and the outer joint member as illustrated. This permits access to be gained to retaining ring 12 by a suitable tool, if it is desired to disconnect the universal joint from the hub assembly. Of course, the sleeve 5 must be removed from collar 7 before this can be done. When the joint is articulated, the outer joint member may be at least partially accommodated within the collar 7.

Thus, it will be seen that the present invention provides a wheel hub assembly for a motor vehicle, having a hub member 1, a bearing assembly with an inner race formed on the hub member, bearing elements 9 and an outer race 14, and a spigot 6 extending axially from an end of the hub member and carrying the inner member 4 of a constant velocity ratio universal joint. The collar 7 is secured to the hub member and carries a flexible sealing sleeve 5 covering the universal joint. The configuration of the collar 7 is such that when the joint is inarticulated a space is provided between it and the outer member 3 of the universal joint, so that access is possible to a retaining ring 12 holding the inner member of the joint on the spigot.

In an embodiment not illustrated, a part of the collar or one rotationally fast therewith may be designed to act as a transmitting element for a rotational speed sensor. For example, the collar itself may be provided with peripheral teeth which run in close proximity to a magnetic sensor fixed to the wheel carrier 13. Alternatively the clip by which the sleeve is secured to the collar may provide such transmitter formations.

While a specific embodiment of the invention has been shown and described in detail to illustrate the application of the inventive principles, it will be understood that the invention may be embodied otherwise without departing from such principles.

What is claimed is:

1. A wheel hub assembly including a wheel carrier comprising:
   a hub member having a spigot axially extending from one end of said hub member;
   bearing means including an inner race formed on said hub member and an outer race bolted to said wheel carrier;
   a constant velocity ratio universal joint having an inner member received on said spigot and an outer member;
   a retaining ring located on said inner member at an end thereof closest to said hub member holding said inner member on said spigot;
   an annular groove provided on said hub member facing said universal joint; and
   a collar on said hub member having an open end facing said universal joint and adapted to have mounted thereon a sealing sleeve extending over said universal joint;
   said collar being provided with a formation received in said annular groove provided on said hub member;
   said wheel hub assembly being arranged such that when said joint is articulated, said outer member of the joint partially enters said collar and when said joint is not articulated, a space is provided between said outer member of said universal joint and said collar to permit access to said retaining ring to facilitate assembly and disassembly between said universal joint and said wheel hub assembly.

2. A wheel hub assembly including a wheel carrier comprising:
   a hub member having a spigot axially extending from one end of said hub member;
   bearing means including an inner race formed on said hub member and an outer race bolted to said wheel carrier;
   a constant velocity ratio universal joint having an inner member received on said spigot and an outer member;
   a retaining ring located on said inner member at an end thereof closest to said hub member holding said inner member on said spigot;
   a collar on said hub member having an open end facing said universal joint and adapted to have mounted thereon a sealing sleeve extending over said universal joint;
   said collar being provided with a hollow cylindrical portion which is press fitted on said spigot;
   said wheel hub assembly being arranged such that when said joint is articulated, said outer member of the joint partially enters said collar and when said joint is not articulated, a space is provided between said outer member of said universal joint and said collar to permit access to said retaining ring to facilitate assembly and disassembly between said universal joint and said wheel hub assembly.

* * * * *